US012083692B2

(12) United States Patent
Khubani et al.

(10) Patent No.: US 12,083,692 B2
(45) Date of Patent: Sep. 10, 2024

(54) PORTABLE HAIR REMOVAL APPARATUS

(71) Applicant: Church & Dwight Co., Inc., Princeton, NJ (US)

(72) Inventors: Anand Khubani, Morristown, NJ (US); Eric Langberg, Milford, PA (US); David Stowers, Morristown, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 0 days.

(21) Appl. No.: 18/346,626

(22) Filed: Jul. 3, 2023

(65) Prior Publication Data

US 2023/0347535 A1 Nov. 2, 2023

Related U.S. Application Data

(63) Continuation of application No. 16/524,441, filed on Jul. 29, 2019, now Pat. No. 11,724,410.

(60) Provisional application No. 62/712,853, filed on Jul. 31, 2018.

(51) Int. Cl.

| | |
|---|---|
| ***B26B 19/38*** | (2006.01) |
| ***A47K 7/04*** | (2006.01) |
| ***B26B 19/46*** | (2006.01) |
| *B26B 19/14* | (2006.01) |

(52) U.S. Cl.

CPC ............ *B26B 19/3853* (2013.01); *A47K 7/04* (2013.01); *B26B 19/3813* (2013.01); *B26B 19/3826* (2013.01); *B26B 19/3833* (2013.01); *B26B 19/46* (2013.01); *B26B 19/14* (2013.01); *B26B 19/3873* (2013.01); *B26B 19/3886* (2013.01)

(58) Field of Classification Search

CPC ............ B26B 19/3853; B26B 19/3813; B26B 19/3826; B26B 19/3833; B26B 19/46; B26B 19/14; B26B 19/3873; B26B 19/3886; A47K 7/04

USPC .......................................................... 362/115

See application file for complete search history.

(56) References Cited

U.S. PATENT DOCUMENTS

| | | | |
|---|---|---|---|
| 2,279,682 | A | 4/1942 | Jackson |
| 2,720,696 | A | 10/1955 | Wadsworth |
| D190,785 | S | 6/1961 | Kruck |
| D191,448 | S | 10/1961 | Veersema |
| 3,116,551 | A | 1/1964 | Anton |
| 3,381,373 | A | 5/1968 | Brown |
| 3,392,443 | A | 7/1968 | Kawano et al. |
| D216,383 | S | 12/1969 | Fischer |

(Continued)

FOREIGN PATENT DOCUMENTS

| | | |
|---|---|---|
| BR | 302018000816-0001 | 7/2018 |
| BR | 302018000818-0001 | 7/2018 |

(Continued)

OTHER PUBLICATIONS

"Finishing Touch Flawless Brows Eyebrow Hair Remover, Blush/ Rose Gold," Date of posting: Jan. 14, 2019, https://www.amazon.com/Finishing-Touch-Flawless-Eyebrow-Remover/dp/B07P9CS38P.

(Continued)

*Primary Examiner* — Omar Flores Sanchez

(74) *Attorney, Agent, or Firm* — Womble Bond Dickinson (US) LLP

(57) ABSTRACT

The present invention provides for a shaving device and more specifically, to a portable, conical shaped shaving (Continued)

apparatus with a central element, top and bottom caps, and when assembled, the apparatus is designed to look like a cosmetic container.

20 Claims, 6 Drawing Sheets

(56) References Cited

U.S. PATENT DOCUMENTS

| | | | |
|---|---|---|---|
| D231,809 | S | 6/1974 | Fujishima |
| D255,166 | S | 5/1980 | Ayukawa et al. |
| 4,227,301 | A | 10/1980 | Van Hemmen et al. |
| D258,701 | S | 3/1981 | McQueen |
| 4,332,321 | A | 6/1982 | Wratschko |
| D279,930 | S | 7/1985 | George |
| D283,059 | S | 3/1986 | Satoh et al. |
| D305,162 | S | 12/1989 | Mockovak |
| D305,806 | S | 1/1990 | Fujisawa |
| D307,491 | S | 4/1990 | Okada |
| D307,497 | S | 4/1990 | Giallourakis |
| 4,912,845 | A | 4/1990 | Inoue |
| 5,012,576 | A | 5/1991 | Johannesson |
| D319,711 | S | 9/1991 | Fujisawa |
| 5,135,406 | A | 8/1992 | Ishikawa |
| D368,984 | S | 4/1996 | Nakashima et al. |
| 5,625,950 | A | 5/1997 | Sterk et al. |
| 5,687,481 | A | 11/1997 | De Boer et al. |
| D400,303 | S | 10/1998 | Tanaka et al. |
| D416,355 | S | 11/1999 | Lerolle |
| D424,746 | S | 5/2000 | Lee |
| 6,272,752 | B1 | 8/2001 | Pino |
| 6,378,210 | B1 | 4/2002 | Bickford |
| 6,502,309 | B2 | 1/2003 | De Vries et al. |
| D473,974 | S | 4/2003 | Fuller |
| D478,690 | S | 8/2003 | Sgariboldi |
| D479,017 | S | 8/2003 | Sgariboldi |
| D485,013 | S | 1/2004 | Leventhal et al. |
| D488,260 | S | 4/2004 | Khubani |
| D497,035 | S | 10/2004 | Khubani |
| D503,495 | S | 3/2005 | Maeda |
| D513,092 | S | 12/2005 | Ajootian |
| D514,257 | S | 1/2006 | Bokelman-Dumas |
| D516,245 | S | 2/2006 | Ohta et al. |
| 7,152,323 | B1 | 12/2006 | Lin |
| D536,135 | S | 1/2007 | Kitagawa |
| D561,941 | S | 2/2008 | Khubani |
| 7,401,406 | B2 | 7/2008 | Morisugi et al. |
| D585,601 | S | 1/2009 | Althoff et al. |
| 7,497,218 | B2 | 3/2009 | Gueret |
| 7,669,605 | B2 | 3/2010 | Cho |
| D617,050 | S | 6/2010 | Lou |
| D617,051 | S | 6/2010 | Pires et al. |
| D632,014 | S | 2/2011 | Lee |
| D634,067 | S | 3/2011 | Stowers et al. |
| D634,068 | S | 3/2011 | Stowers et al. |
| D637,759 | S | 5/2011 | Byun |
| D651,746 | S | 1/2012 | Prat-Pfister |
| D652,990 | S | 1/2012 | Strickland |
| D663,483 | S | 7/2012 | Lee |
| D672,504 | S | 12/2012 | Lyles |
| D673,325 | S | 12/2012 | Martines |
| D674,144 | S | 1/2013 | Yamamoto et al. |
| D674,145 | S | 1/2013 | Ino |
| D674,558 | S | 1/2013 | Ino |
| D675,377 | S | 1/2013 | Boulanger |
| D675,778 | S | 2/2013 | Vetu |
| D675,779 | S | 2/2013 | Vetu et al. |
| 8,484,849 | B2 | 7/2013 | Morisugi et al. |
| 8,484,850 | B2 | 7/2013 | Morisugi et al. |
| 8,563,904 | B2 | 10/2013 | Cho |
| D693,060 | S | 11/2013 | Lyles |
| D695,962 | S | 12/2013 | Prat-Pfister et al. |
| D696,461 | S | 12/2013 | Prat-Pfister et al. |
| D698,491 | S | 1/2014 | Ellison et al. |
| D701,346 | S | 3/2014 | Hefetz et al. |
| D704,066 | S | 5/2014 | De Lima Paschoal et al. |
| 8,726,528 | B2 | 5/2014 | Lyles |
| 8,732,964 | B2 | 5/2014 | Fischer et al. |
| D712,596 | S | 9/2014 | Lee et al. |
| D717,492 | S | 11/2014 | Kulshreshtha |
| D717,493 | S | 11/2014 | Kulshreshtha |
| 8,959,775 | B2 | 2/2015 | Yabuuchi et al. |
| D728,159 | S | 4/2015 | Szymanski |
| D728,160 | S | 4/2015 | Szymanski |
| 9,027,251 | B2 | 5/2015 | Schmitt et al. |
| 9,174,349 | B2 | 11/2015 | Schmitt |
| D757,363 | S | 5/2016 | Sugiyama |
| D758,015 | S | 5/2016 | Prat-Pfister |
| D758,017 | S | 5/2016 | Smith |
| D758,663 | S | 6/2016 | Van Maanen |
| D758,664 | S | 6/2016 | Van Maanen |
| 9,364,960 | B2 | 6/2016 | Ohara et al. |
| D761,586 | S | 7/2016 | Kulshreshtha |
| D776,877 | S | 1/2017 | Zadro |
| D777,375 | S | 1/2017 | Frankel |
| D779,124 | S | 2/2017 | Houyoux |
| D781,496 | S | 3/2017 | Butler et al. |
| D785,871 | S | 5/2017 | Staab et al. |
| D794,962 | S | 8/2017 | De Klein |
| 9,743,738 | B2 | 8/2017 | Sanchez-Martinez et al. |
| D797,377 | S | 9/2017 | Reggiani et al. |
| D803,480 | S | 11/2017 | Wong |
| 9,821,478 | B2 | 11/2017 | Kleine Doepke et al. |
| D808,077 | S | 1/2018 | Boulanger |
| 9,878,457 | B2 | 1/2018 | Kulshreshtha |
| D812,301 | S | 3/2018 | Tan |
| D818,646 | S | 5/2018 | Szymanski et al. |
| D821,204 | S | 6/2018 | Reggiani et al. |
| 10,005,192 | B2 | 6/2018 | Kulshreshtha |
| D828,628 | S | 9/2018 | Mori et al. |
| D828,957 | S | 9/2018 | Rosandick et al. |
| D828,958 | S | 9/2018 | Teteak et al. |
| D830,634 | S | 10/2018 | Gamble et al. |
| D834,253 | S | 11/2018 | Khubani et al. |
| D834,254 | S | 11/2018 | Khubani et al. |
| D836,840 | S | 12/2018 | Khubani et al. |
| D841,246 | S | 2/2019 | Stowers |
| D841,247 | S | 2/2019 | Stowers |
| D841,887 | S | 2/2019 | Stowers |
| 10,300,619 | B2 | 5/2019 | Khubani et al. |
| D853,644 | S | 7/2019 | Stowers et al. |
| D853,645 | S | 7/2019 | Stowers et al. |
| D857,296 | S | 8/2019 | Khubani et al. |
| D857,297 | S | 8/2019 | Khubani et al. |
| 10,391,649 | B1 | 8/2019 | Khubani et al. |
| D865,291 | S | 10/2019 | Xiong |
| D868,373 | S | 11/2019 | Kling et al. |
| D874,730 | S | 2/2020 | Khubani et al. |
| D881,470 | S | 4/2020 | Zhou |
| D882,874 | S | 4/2020 | Peng |
| D888,340 | S | 6/2020 | Wei |
| D888,341 | S | 6/2020 | Stowers |
| D898,286 | S | 10/2020 | Khubani et al. |
| D898,287 | S | 10/2020 | Khubani et al. |
| 10,850,409 | B2 | 12/2020 | Kleine Doepke et al. |
| D907,851 | S | 1/2021 | Lombardo et al. |
| D907,852 | S | 1/2021 | Lombardo et al. |
| D909,679 | S | 2/2021 | Chen |
| D911,610 | S | 2/2021 | Zhang |
| D915,673 | S | 4/2021 | Neinae |
| D921,295 | S | 6/2021 | Khubani et al. |
| D930,710 | S | 9/2021 | Mao |
| D933,297 | S | 10/2021 | Luo et al. |
| D933,893 | S | 10/2021 | Luo |
| D938,652 | S | 12/2021 | Long |
| D940,957 | S | 1/2022 | Xiong |
| D945,704 | S | 3/2022 | Lombardo et al. |
| D950,853 | S | 5/2022 | Luo |
| D960,451 | S | 8/2022 | Huang |
| D962,542 | S | 8/2022 | Luo |
| 11,400,609 | B2 | 8/2022 | Khubani et al. |
| D992,819 | S | 7/2023 | Zhang |
| 2005/0028369 | A1 | 2/2005 | Cocchiarella et al. |
| 2005/0144783 | A1 | 7/2005 | Yiu |

(56) References Cited

U.S. PATENT DOCUMENTS

| | | | |
|---|---|---|---|
| 2005/0241153 | A1 | 11/2005 | Koike |
| 2006/0156550 | A1 | 7/2006 | Beugels et al. |
| 2006/0156551 | A1 | 7/2006 | Khubani et al. |
| 2007/0277379 | A1 | 12/2007 | Okabe |
| 2008/0072430 | A1 | 3/2008 | Cafaro et al. |
| 2008/0250645 | A1 | 10/2008 | Tringali et al. |
| 2010/0095531 | A1 | 4/2010 | Akkerman et al. |
| 2011/0030220 | A1 | 2/2011 | Shimizu |
| 2011/0072668 | A1 | 3/2011 | Morisugi et al. |
| 2011/0094106 | A1 | 4/2011 | Kling et al. |
| 2011/0232096 | A1 | 9/2011 | Yabuuchi et al. |
| 2013/0212885 | A1 | 8/2013 | Lyles |
| 2013/0291390 | A1 | 11/2013 | Gajria et al. |
| 2014/0130642 | A1 | 5/2014 | Rodriquez |
| 2014/0157957 | A1 | 6/2014 | Mimura et al. |
| 2014/0230257 | A1 | 8/2014 | Eagleton et al. |
| 2015/0246454 | A1 | 9/2015 | Mintz et al. |
| 2016/0101529 | A1 | 4/2016 | Wind |
| 2016/0143410 | A1 | 5/2016 | Stampe et al. |
| 2016/0176060 | A1 | 6/2016 | Kulshreshtha |
| 2017/0106547 | A1 | 4/2017 | Lau |
| 2017/0144317 | A1 | 5/2017 | Shimizu |
| 2017/0165853 | A1 | 6/2017 | Li et al. |
| 2017/0203450 | A1 | 7/2017 | Hitson |
| 2017/0258198 | A1 | 9/2017 | Steeman et al. |
| 2017/0266824 | A1 | 9/2017 | Veldhuis et al. |
| 2018/0071927 | A1 | 3/2018 | Kleine Doepke et al. |
| 2018/0207823 | A1 | 7/2018 | Neyer et al. |
| 2018/0290318 | A1 | 10/2018 | Khubani et al. |
| 2018/0326603 | A1 | 11/2018 | Moss |
| 2018/0333875 | A1 | 11/2018 | Lau |
| 2019/0320778 | A1 | 10/2019 | Moon |
| 2020/0031004 | A1 | 1/2020 | Khubani et al. |
| 2020/0039096 | A1 | 2/2020 | Khubani et al. |
| 2020/0254638 | A1 | 8/2020 | Khubani et al. |
| 2023/0148728 | A1 | 5/2023 | Zhang |

FOREIGN PATENT DOCUMENTS

| | | | |
|---|---|---|---|
| CA | 179118 | | 5/2019 |
| CA | 179119 | | 5/2019 |
| CN | 300831331 | | 9/2008 |
| CN | 201132325 | Y | 10/2008 |
| CN | 301688539 | | 9/2011 |
| CN | 301903889 | | 5/2012 |
| CN | 302125081 | | 10/2012 |
| CN | 202943656 | | 5/2013 |
| CN | 203471807 | | 3/2014 |
| CN | 203471808 | | 3/2014 |
| CN | 203636849 | | 6/2014 |
| CN | 102848408 | | 4/2015 |
| CN | 303457621 | | 11/2015 |
| CN | 303482791 | | 12/2015 |
| CN | 103433945 | | 2/2016 |
| CN | 205363974 | | 7/2016 |
| CN | 304185953 | | 6/2017 |
| CN | 304186004 | | 6/2017 |
| CN | 304334779 | | 10/2017 |
| CN | 107379032 | | 11/2017 |
| CN | 304416637 | | 12/2017 |
| CN | 304446416 | | 1/2018 |
| CN | 304457107 | | 1/2018 |
| CN | 304501107 | | 2/2018 |
| CN | 304506970 | | 2/2018 |
| CN | 304516516 | | 2/2018 |
| CN | 304516519 | | 2/2018 |
| CN | 304615257 | | 5/2018 |
| CN | 304621293 | | 5/2018 |
| CN | 304644627 | | 5/2018 |
| CN | 304696505 | | 6/2018 |
| CN | 304700973 | | 6/2018 |
| CN | 207616632 | | 7/2018 |
| CN | 207639841 | | 7/2018 |
| CN | 304739096 | | 7/2018 |
| CN | 304764441 | | 8/2018 |
| CN | 304814295 | | 9/2018 |
| CN | 304827394 | | 9/2018 |
| CN | 108673574 | | 10/2018 |
| CN | 208020233 | U | 10/2018 |
| CN | 304851086 | | 10/2018 |
| CN | 304883675 | | 11/2018 |
| CN | 304889593 | | 11/2018 |
| CN | 304947969 | | 12/2018 |
| CN | 304964171 | | 12/2018 |
| CN | 304970030 | | 12/2018 |
| CN | 305077826 | | 3/2019 |
| CN | 109910065 | | 6/2019 |
| CN | 209551804 | U | 10/2019 |
| CN | 305449692 | | 11/2019 |
| CN | 305583508 | | 1/2020 |
| CN | 210256243 | U | 4/2020 |
| CN | 305783395 | | 5/2020 |
| CN | 211053750 | U | 7/2020 |
| CN | 211137244 | | 7/2020 |
| CN | 211362346 | | 8/2020 |
| CN | 211517559 | | 9/2020 |
| CN | 211761702 | U | 10/2020 |
| CN | 211806273 | | 10/2020 |
| CN | 306170445 | | 11/2020 |
| CN | 212044839 | U | 12/2020 |
| CN | 213106942 | U | 5/2021 |
| CN | 306599855 | | 6/2021 |
| CN | 213859377 | U | 8/2021 |
| CN | 214870741 | U | 11/2021 |
| CN | 214924642 | U | 11/2021 |
| CN | 214924645 | U | 11/2021 |
| CN | 215241003 | U | 12/2021 |
| CN | 114012791 | | 2/2022 |
| CN | 216030960 | | 3/2022 |
| CN | 216372304 | U | 4/2022 |
| CN | 216707567 | | 6/2022 |
| CN | 216913921 | | 7/2022 |
| CN | 216967862 | U | 7/2022 |
| CN | 217072459 | U | 7/2022 |
| CN | 217225630 | | 8/2022 |
| CN | 217728812 | | 11/2022 |
| DE | 402017203423-0003 | | 1/2018 |
| EM | EU 001272488-0003 | | 4/2011 |
| EM | EU 001272488-0004 | | 4/2011 |
| EM | EU 001401533-0001 | | 3/2016 |
| EM | 004171247-0001 | | 9/2017 |
| EM | 004385656-0001 | | 1/2018 |
| EM | EU 004385656-0002 | | 1/2018 |
| EM | 004698421-0001 | | 2/2018 |
| EM | 004411981-0007 | | 4/2018 |
| EM | 005316213-0001 | | 6/2018 |
| EM | 005316213-0002 | | 6/2018 |
| EM | 005513884-0001 | | 7/2018 |
| EM | 005513884-0002 | | 7/2018 |
| EM | 005611712-0001 | | 8/2018 |
| EM | 005823119-0001 | | 11/2018 |
| EM | 005823119-0002 | | 11/2018 |
| EM | 005837267-0001 | | 11/2018 |
| EM | 005843216-0001 | | 12/2018 |
| EM | 005843216-0002 | | 12/2018 |
| EM | 006565495-0001 | | 6/2019 |
| EM | 006684940-0001 | | 8/2019 |
| EM | 006645461-0001 | | 9/2019 |
| EM | 008423412-0001 | | 4/2021 |
| EM | 015017203-0001 | | 4/2023 |
| EM | 015017203-0002 | | 4/2023 |
| EP | 3858563 | | 8/2021 |
| GB | 6056436 | | 3/2019 |
| GB | 9006684940-0001 | | 8/2019 |
| GB | 6209113 | | 5/2022 |
| IN | 313208-001-0001 | | 12/2019 |
| JP | D1189187 | | 9/2003 |
| JP | D1189459 | | 9/2003 |
| JP | D1437855 | | 3/2012 |
| JP | D1504741 | | 8/2014 |
| JP | D1504917 | | 8/2014 |
| JP | D1611116 | | 8/2018 |
| JP | D1611117 | | 8/2018 |
| JP | 1750678 | | 8/2023 |

(56) References Cited

FOREIGN PATENT DOCUMENTS

| | | |
|---|---|---|
| KR | 3020060050934 | 8/2007 |
| KR | 300913973.0000 | 7/2017 |
| KR | 3020170039818 | 8/2017 |
| KR | 300922559.0000 | 9/2017 |
| KR | 3020170041319 | 9/2017 |
| KR | 3020180000186 | 1/2018 |
| KR | 3020180007491 | 2/2018 |
| RU | 00094348 | 7/2015 |
| WO | WO D049067-001 | 6/1999 |
| WO | WO 2014/088496 | 6/2014 |
| WO | WO 2016/187812 | 12/2016 |
| WO | WO 2020/028365 | 2/2020 |

OTHER PUBLICATIONS

Auction., Female Epilator Finishing Touch Flawless Hair Remover, Jan. 31, 2018, http://itempage3.auction.co.kr/DetailView.aspx?ItemNo=B492760711&frm3=V2.

Decision of Invalidity of European Registered Community Design 004171247-0001, issued Apr. 12, 2018.

Finishing Touch Flawless Brows, amazon.com, 1 page, (Year: 2018).

Hammacher Schlemmer, The Flawless Brow Shaper, Reviewed 2018, https://www.hammacher.com/product/flawless-brow-shaper#.

https://kohls.com/product/prd-4275428/finishing-touch-flawless-face-mermaid-facial-hair-remover.asp Finishing touch flawless face mermaid hair remover www.kohls.com, 1 page, downloaded Sep. 2020, reviewed as early as Mar. 2020.

Lady Shaver Lipstick shape, www.imall.com, 1 page, downloaded Aug. 7, 2019.

Naver, Batum Floris Down Epilator, Feb. 28, 2018, https://search.shopping.naver.com/catalog/13460499855?qury=%EC%A0%9C%EB%AA%A8%EA%B8%B0&%NaPm=ct%3Dklah47ng%7Cci%3D928534e60d40eec7669526e193a92bb8fdc1b65a%7Ctr%3Dslsl%7Csn%3D95694%7Chk%3Df2b44ce47b9e71173268495733d86795b15f5012.

Naver, Flawless Facial Fluffy Epilator, Feb. 28, 2019, https://search.shopping.naver.com/catalog/20309390234?query=%EC%A0%9C%EB%AA%A8%EA&B8%B0&NaPm=ct%3Dklahme60%7Ccr%Dcc07522a00d5087a54f9cd76f89d0a9ff2583000%7Cu%3Dslsl%7Csn%3D95694%7Chk%3D76b5a6d9d445a8a295dad81c52205aba29ee1216.

Wayback Machine "Site live" date for Flawless Brows, Mar. 20, 2018, <https://web.archive.org/web/*/getflawlessbrows.com/*>.

www.amazon.com, Bangbreak—Eyebrow Hair Remover, Customer Review (Daisy Lumahan), "Say 'NO' to Ouch and save money going to the salon use this Laser hair removal," Dec. 28, 2018.

www.amazon.com, BESTIDY Women's Brows, Customer Review (Ashley K), "Used product. Do not recommend," Oct. 10, 2018.

www.amazon.com, Finishing Touch Flawless Brows, Customer Review (Pamela), "Even my Eyebrow stylist was IMPRESSED," 1 page, Jul. 22, 2018.

www.amazon.com, MINO Ant Eyebrows Remover, Customer Review (Lexi W), "Disappointed," Nov. 17, 2018.

www.freakinreviews.cm Finishing Touch Flawless Review, 2 pages, posted on Mar. 8, 2017.

Finishing Touch Flawless, https://www.amazon.com/Finishing-Flawless-Womens-Painless-Remover, reviewed as early as 2018, 1 page (Year: 2018).

Finishing Touch Flawless Legs Commercial—As Seen on TV, Feb. 5, 2018. https://www.youtube.com/watch?y=N7cRggAgKTM.

The Wayback Machine, "Site live" date for Flawless Legs, Feb. 10, 2018, https://www.getflawlesslegs.com/.

Flawless Legs Review | Testing As Seen on TV Products, Feb. 26, 2018. https://www.youtube.com/watch?v=ykp5z6CshtJ.

www.amazon.com, Finishing Touch Flawless Legs Women's Hair Remover, Verified Purchaser review, Mar. 8, 2018.

New Flawless Body Touch Up, Published on: Jul. 7, 2023 (online), Retrieved on: Jan. 10, 2024 (online), https://www.instagram.com/p/CuZ-T6DubrR/ (Year: 2023).

Finishing Touch Flawless Body Touch Up, Published on: Jul. 12, 2023 (online), Retrieved on: Jan. 10, 2024 (online), https://www.amazon.com/Finishing-Touch-Flawless-Electric-Closest/dp/B0C2JSVTH8/ref=cm_cr_arp_d_product_top?ie=UTF8 (Year: 2023).

PORTABLE HAIR REMOVAL APPARATUS

CROSS-REFERENCE TO RELATED APPLICATIONS

This application is a continuation of U.S. application Ser. No. 16/524,441, filed Jul. 29, 2019, which is a utility of the provisional application of U.S. Application Ser. No. 62/712,853, filed on Jul. 31, 2018, which applications are hereby incorporated in their entirety by reference in this application.

BACKGROUND OF THE INVENTION

Field of the Invention

This invention relates to an article and more specifically, to a portable shaving apparatus designed to look like a cosmetic container such as a lipstick case, make-up case or make-up applicator case.

SUMMARY OF THE INVENTION

In one embodiment, the present invention relates to a portable shaving apparatus comprising: a central component having opposing ends, a first top end comprising a removable attachment and a second bottom end having an exposed cavity, the exposed cavity designed to receive a power source, a first removable, external component designed to attach to a portion of the central component and cover the cavity, and a second removable, external component designed to cover the attachment, and the second external component is designed to attach to a portion of the central component and when in a closed position, and the apparatus is designed to look like a cosmetic container.

In a further embodiment, a shaving apparatus comprising a central component having opposing ends, a first top end comprising a removable attachment having a shaving head that has sides that are conical in shape leading up to a flat top surface, there are elongated slits that continually run from sides to a flat top, the flat top also has circular openings, the elongated slits and circular openings allow the apparatus to shave hair that comes into contact with the side and the flat top surfaces and a second bottom end having an exposed cavity, the exposed cavity designed to receive a power source, a first removable, external component designed to attach to a portion of the central component and cover the cavity, and a second removable, external component designed to cover the attachment, the second external component is designed attach to a portion of the central component and when in a closed position, the apparatus is designed to look like a cosmetic container.

In another embodiment, the apparatus further comprising a motor, and the motor is situated within the first top end of the central component. In yet another embodiment, the apparatus further comprising a power source, and the power source is a battery, including rechargeable batteries.

In still another embodiment, the attachment is selected from a group consisting essentially of a rotary blade, a shaving blade, a trimmer, a brush, a buffer, a pumice, a rotary cleaning device, an exfoliating device, a make-up brush, a make-up remover and combinations thereof. In still yet another embodiment, the apparatus is from about one inch to about four inches long or tall.

In a further embodiment, the cosmetic container is selected from a group consisting essentially of a lipstick case, an applicator case, a makeup case and combinations thereof. In a further embodiment, the external component of the apparatus has a cross section, and the cross section has a shape selected from a group consisting essentially of oval, ellipse, eye-shaped, oblong and combinations thereof.

In still a further embodiment, the apparatus further comprising at least one light. In yet a further embodiment, the light is designed to illuminate target area of a user's body. In still yet a further embodiment, the light is a flashlight situated on at least one of the external components. In another further embodiment, the apparatus further comprising an on/off switch situated on the central component.

In another further embodiment, the second external component comprises a closed top end and an opened bottom end, and the bottom end of the second external component having at least one protrusion, and the protrusion designed to align with the on/off switch and shut off the apparatus in the closed position.

In another further embodiment, the second external component comprises a closed top end and an opened bottom end, and the bottom end of the second external component having at least one protrusion, the protrusion designed to align with the on/off switch and shut off the apparatus in the closed position. In still another embodiment, the second external component is self-aligning with the first external component.

In yet another embodiment, the central component comprises a storage compartment. In still yet another embodiment, at least one of the external components comprises a storage compartment. In a further embodiment, the apparatus further comprising a shaft coupled to the motor, the shaft is an elongated polygon configured to interface with the attachment. In another further embodiment, the apparatus further comprising a mirror.

In a further embodiment, the present invention provides for a portable shaving apparatus comprising: a central element having opposing ends, a first top end comprising a removable attachment and a second bottom end having an internal cavity, the internal cavity designed to receive a power source, a first removable bottom cap designed to attach to a portion of the central element and cover at least a portion of the bottom end of the central element, and a second removable top cap designed to cover the attachment, the second cap is designed attach to a portion of the central element and when in a closed position, and the apparatus is designed to look like a cosmetic container.

In a further embodiment, the apparatus further comprises a motor, a shaft, a power source and at least one storage compartment. In another embodiment, an apparatus having at least one blade that is designed to cut hair that enters the shaving head from the sides and/or the flat top. In yet another embodiment, an apparatus having at least two blades that are designed to cut hair that enters the shaving head from the sides and/or the flat top.

In still another embodiment, an apparatus having a shaving head having a light to illuminate an area where the apparatus is being used. In still yet another embodiment, an apparatus having a shaving head that illuminates an area where the apparatus is being used with three hundred sixty degrees of light.

BRIEF DESCRIPTION OF THE DRAWINGS

The accompanying drawings are included to provide a further understanding of the present invention. These drawings are incorporated in and constitute a part of this specification, illustrate one or more embodiments of the present invention and together with the description serves to explain the principles of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention is disclosed herein, however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Figure 1:
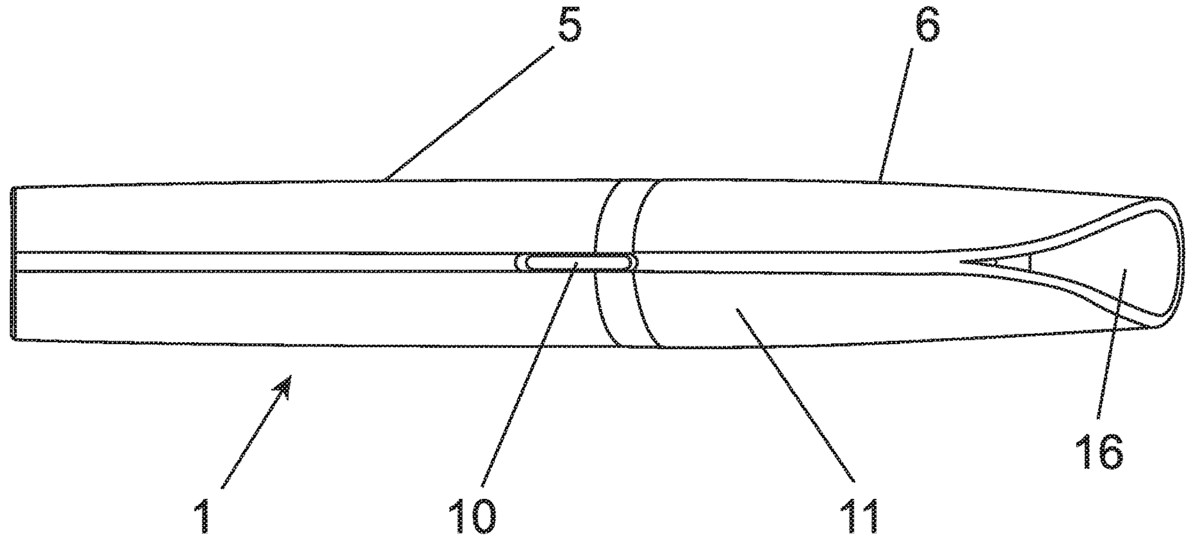
FIG. 1 is a front view of one of the embodiments of the present invention.

FIG. 1 illustrates the shaving apparatus 1 having a first removable external structure 5, a second external removable structure 6, an on/off switch 10, a protrusion 11 on the second removable external component 6, and a mirror 16. The protrusion 11 helps prevent the shaving apparatus from moving and/or rolling off of flat surfaces. The mirror 16 is located on the top of the second external component 6. The mirror 16 can be located on alternative areas of the shaving apparatus. The power switch 10 has an on and off position, it is designed in such away that if it is in the on position and the second external component 6 is placed onto the shaving apparatus 1 the power switch 10 is moved to the position.

Figure 2:
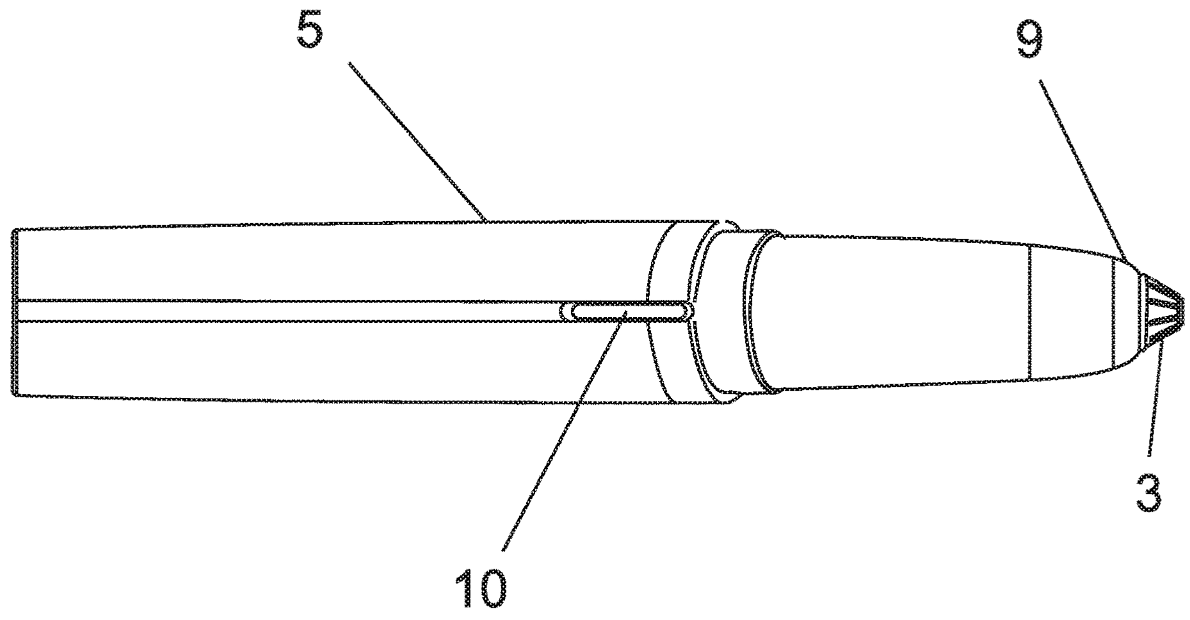
FIG. 2 is a front view of FIG. 1 showing second removable external component removed of one of the embodiments of the present invention.

FIG. 2 illustrates the shaving apparatus 1 having a removable attachment 3, a first removable external structure 5, a light 9, an on/off switch 10. FIG. 2 further shows that the light 9 is located just below the conical tip of removable attachment. The light 9 provides 360 degrees of light around the conical tip providing for optimal lighting of a surface being shaved.

Figure 3:
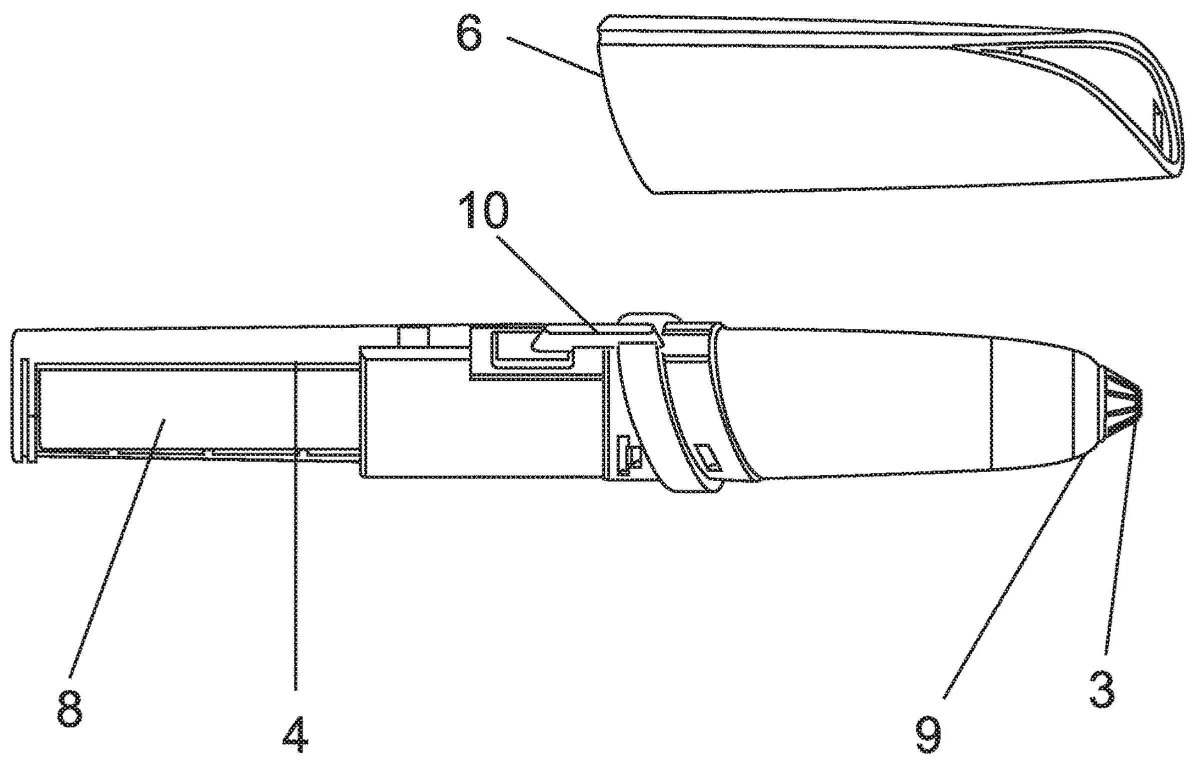
FIG. 3 is a perspective view of the central component of one of the embodiments of the present invention.

FIG. 3 illustrates the central component 2 of the shaving apparatus 1, having a removable attachment 3, a cavity 4, a second removable external structure 6, a power source 8 and an on/off switch 10. FIG. 3 further shows the cavity 4 exposed by having the first external structure 5 removed from the shaving apparatus 1. The first external structure 5 and the second external may be removable from the shaving apparatus 1. The first external structure 5 can be permanently connected to said shaving apparatus 1 thereby containing the contents of cavity 4.

Figure 4:
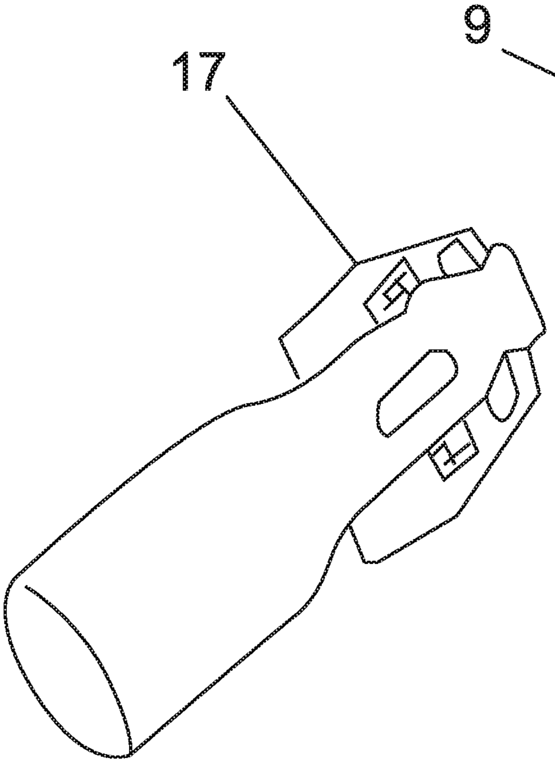
FIG. 4 is a side view of one of the embodiments of the present invention.

FIG. 4 shows the blade 17 of the shaving head 3. The blade 17 is capable of cutting from the sides and from the top of the shaving head.

Figure 5:
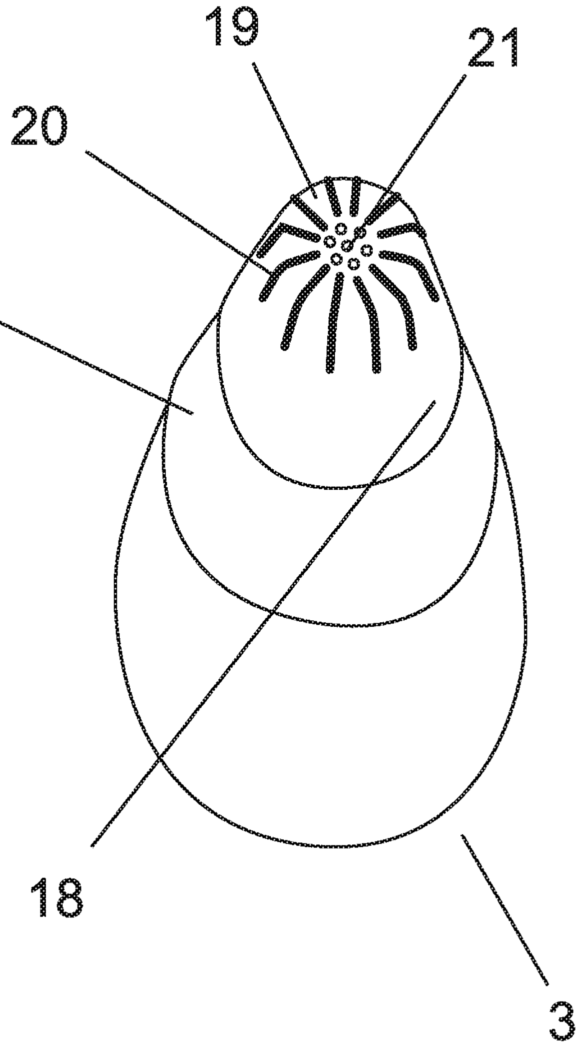
FIG. 5 is a top view of one of the embodiments of the present invention, and FIG. 6

FIG. 5 shows the attachment (shaving head) 3 having a light 9, conical sides 18 a flat top 19, elongated slits 20 that run from at least a portion of the conical sides 18 to the at least a portion of the flat top 19, and circular openings 21 on the flat surface. The blade 17 is designed so that is can cut hairs that enter either the sides or top of the shaving head 3.

FIG. 4 and FIG. 5 show that the blade 17 has a shape that mirror or compliment the conical side 18 and flat top 19 of the shaving head 3. The complimentary shape of the blade 17 to the shaving head 3 is what allows for hair to be cut when they enter from the circular opening 21 on the top flat surface of the shaving head 3 and the elongated slits 21 from the sides.

Figure 6:
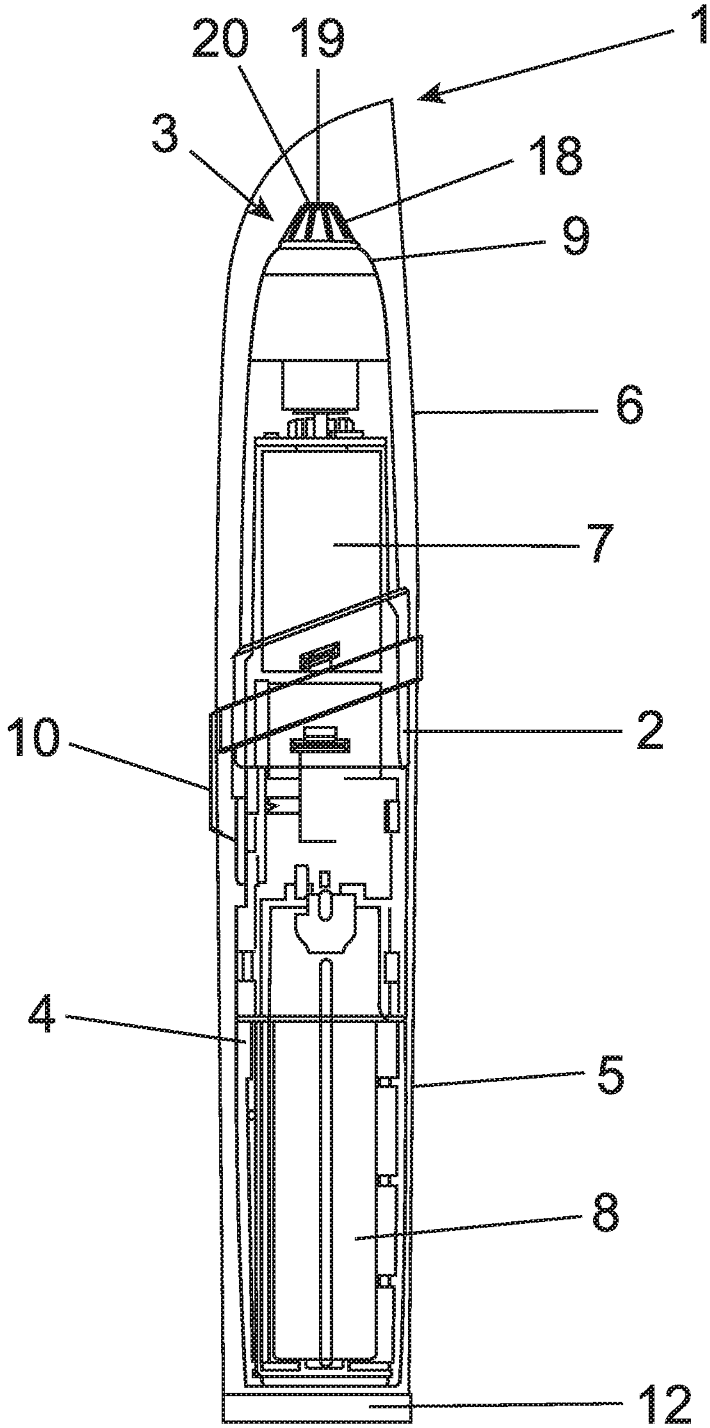
Figure 7:
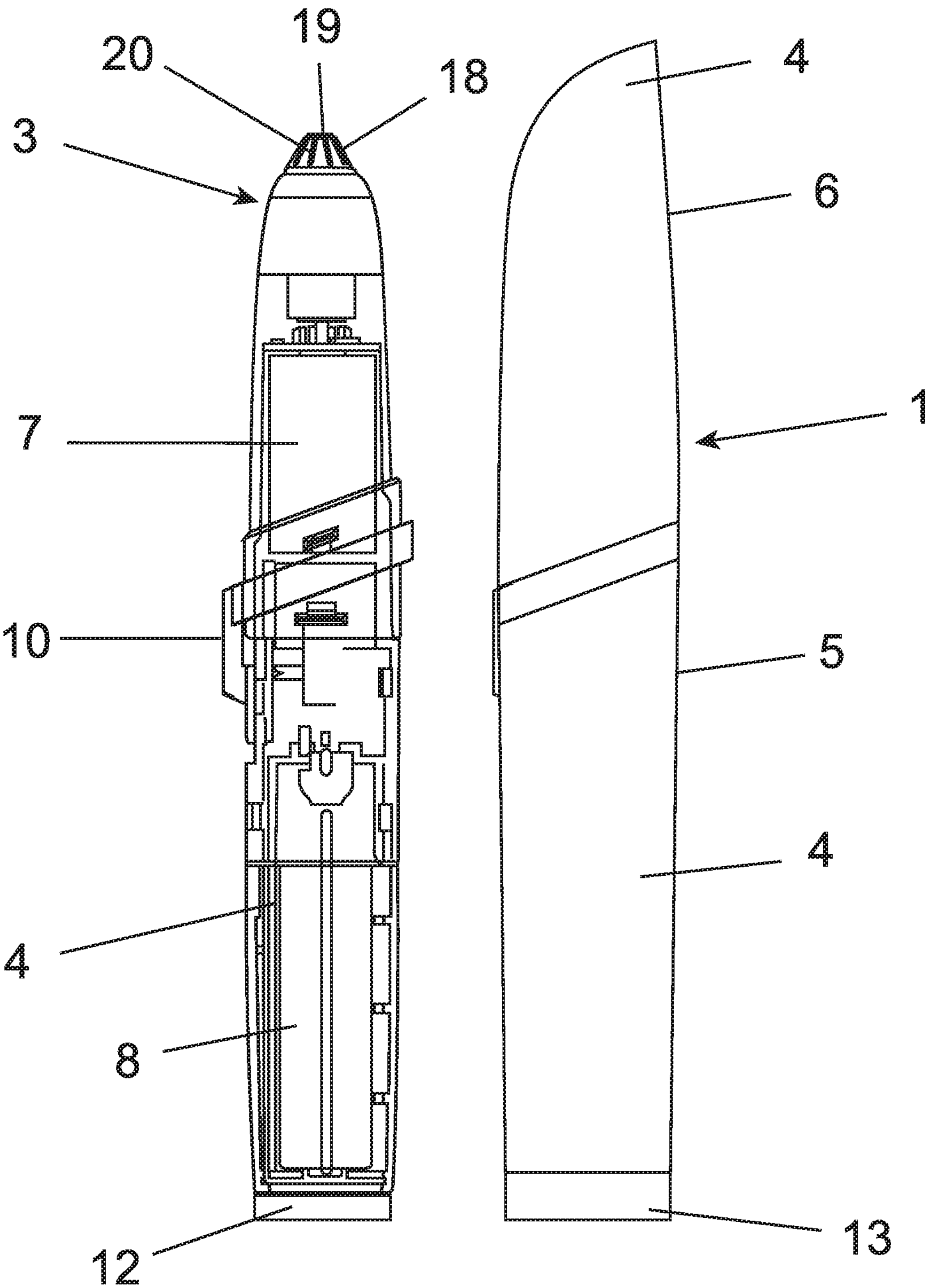
FIG. 7 is a side view of the internal structure of one of the embodiments of the present invention.

FIG. 6 and FIG. 7 illustrate the shaving apparatus 1 having a central component 2, a removable attachment 3, a cavity 4 of the central component 2, a first removable external structure 5, a second external removable structure 6, a motor 7, a power source 8, an on/off switch 10, a storage compartment 12 of the central component 2, a storage compartment 13 of first removable external structure 5, and a storage compartment 14 of second removable external structure 6. The cavity of the central component 2 receives a power source 7. The second removable structure 6 houses the motor 7. The on/off switch 10 is located on the exterior surface of the first removable structure 5.

The power source 8 sends power to the motor 7 which creates rotary power. The rotary power of the motor causes the removable attachment 3 (having head 3) to rotate in operation allowing for a cutting action. The on/off switch 10 allows to power source 8 to deliver power to the motor 7 to make the shaving apparatus 1 in an operating mode and to stop power from being sent to the motor 8 in an off mode.

Numerous modifications and variations of the present invention are possible in light of the above teachings. It is therefore to be understood that within the scope of the attendant claims attached hereto, this invention may be practiced otherwise than as specifically disclosed herein.

What is claimed is:

1. A portable shaving apparatus comprising:

a central component having opposing ends, a first top end comprising a removable attachment having a shaving head that has sides that are conical in shape leading up to a flat top surface, there are elongated slits that continually run from sides to a flat top, the flat top also has circular openings, the elongated slits and circular openings allow the apparatus to shave hair that comes into contact with the side and the flat top surfaces, wherein the shaving head has a light to illuminate an area with said apparatus is being used with three hundred sixty degrees of light.

2. The portable shaving apparatus of claim 1, wherein the central component comprises a second bottom end having an exposed cavity, the exposed cavity designed to receive a power source.

3. The portable shaving apparatus of claim 2, further comprising a first removable, external component designed to attach to a portion of the central component and cover the cavity.

4. The portable shaving apparatus of claim 3, further comprising a second removable, external component designed to cover the attachment, and the second external component is designed to attach to a portion of the central component.

5. The portable shaving apparatus of claim 1, further comprising a motor.

6. The portable shaving apparatus of claim 1, further comprising a power source, said power source is a battery.

7. The portable shaving apparatus of claim 6, wherein the battery includes rechargeable batteries.

8. The portable shaving apparatus of claim 1, wherein said apparatus is from about one inch to about seven inches in length.

9. The portable shaving apparatus of claim 1, further comprising an on/off switch situated on said central component.

10. The portable shaving apparatus of claim 1, further comprising a mirror.

11. The portable shaving apparatus of claim 1, further comprising at least one blade that is designed to cut hair that enters the shaving head from the sides and said flat top.

12. A portable shaving apparatus comprising:

a shaving head that has sides that are conical in shape leading up to a flat top surface, there are elongated slits that continually run from sides to a flat top, the flat top also has circular openings, the elongated slits and circular openings allow the apparatus to shave hair that comes into contact with the side and the flat top surfaces;

a first removable, external component;

a second removable, external component;

a light to illuminate an area with said apparatus is being used with three hundred sixty degrees of light; and an on/off switch.

13. The portable shaving apparatus of claim 12, further comprising a motor.

14. The portable shaving apparatus of claim 12, further comprising a power source.

15. The portable shaving apparatus of claim 14, wherein the power source is a battery including rechargeable batteries.

16. The portable shaving apparatus of claim 12, further comprising a central component having opposing ends, a first top end comprising the shaving head and a second bottom end having an exposed cavity, the exposed cavity designed to receive a power source.

17. The portable shaving apparatus of claim 16, wherein the first removable, external component is designed to attach to a portion of the central component and cover the cavity.

18. The portable shaving apparatus of claim 16, wherein the second removable, external component is designed to attach to a portion of the central component.

19. The portable shaving apparatus of claim 12, further comprising at least one blade that is designed to cut hair that enters the shaving head from the sides and said flat top.

20. The portable shaving apparatus of claim 12, further comprising a mirror.

* * * * *